United States Patent [19]

Behrens et al.

[11] Patent Number: 5,351,998
[45] Date of Patent: Oct. 4, 1994

[54] COUPLING DEVICE

[75] Inventors: Gunter Behrens, Schloss-Holte; Dieter Ehrke, Steinhagan, both of Fed. Rep. of Germany

[73] Assignee: Parker Ermeto GmbH, Bielefeld, Fed. Rep. of Germany

[21] Appl. No.: 800,677

[22] Filed: Nov. 27, 1991

[30] Foreign Application Priority Data

Dec. 3, 1990 [DE] Fed. Rep. of Germany ....... 4038539

[51] Int. Cl.⁵ ............................................ F16L 17/02
[52] U.S. Cl. ................... 285/382.7; 285/341; 285/342
[58] Field of Search ................... 285/382.7, 341, 342

[56] References Cited

U.S. PATENT DOCUMENTS

| | | | |
|---|---|---|---|
| 3,069,188 | 12/1962 | Crawford | 285/382.7 |
| 3,136,897 | 1/1979 | Haluch | 185/382.7 |
| 3,250,550 | 5/1966 | Lyon | 285/382.7 |
| 3,695,640 | 10/1972 | Clague | 285/341 |
| 3,707,302 | 12/1972 | Hiszpanski | 285/382.7 |
| 3,708,186 | 1/1973 | Takagi et al. | 285/382.7 |
| 3,736,008 | 5/1973 | Crawford | 285/382.7 |
| 3,857,591 | 12/1974 | Voss | 285/382.7 |
| 3,869,393 | 3/1975 | Booker | 285/94 |
| 3,879,070 | 4/1975 | Russ | 285/342 |
| 4,037,864 | 7/1977 | Anderson et al. | 285/342 |
| 4,235,461 | 11/1980 | Normark | 285/341 |
| 4,309,050 | 1/1982 | Legris | 285/382.7 |
| 4,848,802 | 7/1989 | Wolf et al. | 285/341 |
| 5,074,599 | 12/1991 | Wirbel et al. | 285/341 |

FOREIGN PATENT DOCUMENTS 1253531 5/1968 Fed. Rep. of Germany .

Primary Examiner—Eric K. Nicholson
Attorney, Agent, or Firm—Christopher H. Morgan

[57] ABSTRACT

The invention concerns a coupling device for maximum pressure-tight threaded pipe connectors with a standard coupling body, with a 24 degree connector, a coupling nut to effect a pressure-tight connection, a standard pipe or a connection stub for connection to other system components, and a two-part ring whereby one ring is provided with a holding element which takes the form of a cutting or clamping ring and the second ring takes the form of a sealing ring (6) for the coupling body (1) and is positioned in front of the holding element (7). The sealing ring is provided with a stop face (10) which progresses radially to its ring axis (9) and, when fitted, abuts on to the inner ring face (11) of the coupling body (1) which extends over at least a part of the inner bevel face [cone] (2) of the coupling body (1). The sealing element presents a conically progressing sliding face (14) for the holding element (7) and a stop face (15) progressing radially to the pipe or ring axis (9). The sliding surface (14) of the sealing element (6) takes the form of a cone and is surface treated.

12 Claims, 5 Drawing Sheets

ILLUSTRATION OF A DIRECT INSTALLATION

ILLUSTRATION OF A FINAL INSTALLATION

COUPLING DEVICE

BACKGROUND OF THE INVENTION

1. Field of the Invention

The invention relates to a coupling device for maximum pressure-tight threaded pipe connectors with a standard coupling body with a 24 degree connector, a coupling nut, to effect a pressure-tight connection, a standard pipe or a connection stub for connection to other system components and a two-part ring whereby one ring takes the form of a holding element, preferably a cutting or clamping ring.

2. Description of the Prior Art

For the manufacture of coupling devices for pressure-tight threaded couplings, the use of a two-part ring acting as a cutting or clamping ring is prior art. DIN 4000 Part 36, Number 13, for example, describes a double wedge ring which comprises two separate wedge or clamping rings which, when being tightened, work together in overlapping timed sequence. It is thus not possible for the fitter to determine positively the end of the fitting process, with the resultant inability to exclude faulty fitting. At the very least, considerable experience on the part of the fitter of the force processes developed in the coupling device during tightening is called for, if the incidence of faulty fitting is to be reduced or eliminated.

A threaded pipe sleeve coupling is known from DE-PS 12 53 531 which is provided with two consecutively arranged compression washers which are caused to dig in to the wall of the pipe which they enclose. Here again the problems described above are encountered during fitting as the forces applied to the two rings overlap and the stage the tightening has reached cannot be positively registered. In addition considerable force has to be exerted during fitting to overcome frictional forces.

SUMMARY OF THE INVENTION

The objective of the invention is the avoidance of these disadvantages by the provision of a coupling device which uses standard coupling and screw elements in which the tightening force when compared with the current state of the art for standard cutting ring couplings with 24 degree cones is considerably reduced and the preparatory and final fitting of cutting ring threaded couplings and the precision pressure and high pressure tightness are considerably improved.

The attainment of this objective by the invention resides in the fact that second ring of the threaded coupling referred to above takes the form of a sealing element for the coupling body and is positioned in front of the holding element and that the sealing ring is provided with a stop face which progresses radially to its ring axis and which, when fitted, abuts on to the inner ring face of the coupling body which extends over at least a part of the inner bevel face of the coupling body and which presents a conically progressing sliding face for the holding element and a stop face progressing radially to the pipe or ring axis.

The invention resides in the knowledge that the functional separation of a two-part ring in a holding element and in a sealing element solves a number of problems as the separation permits each of the elements to be designed specifically for the task it is desired to address as the following will show.

It is thus of advantage and technically easily possible to design the sliding surface of the sealing element in the form of a cone and to treat its surface in such a way that the friction arising during the fitting process between the holding and the sealing elements is reduced.

One embodiment of the invention provides that part of the sealing element fabricated in metal which extends to at least one part of the inner cone face of the coupling body is provided with a metal sealing lip. This version is particularly useful for application of the coupling device in high temperature conditions and where aggressive media are used, where elastomers cannot be employed. If such applications are not envisaged when the device is fitted, an elastomer seal ring is provided in front of the sealing element thus achieving a high degree of pressure tightness.

It is particularly advantageous for fitting to have the elastomer sealing ring and the sealing element connected. This can be achieved either by vulcanization or the use of adhesives.

The invention provides a particularly favorable force characteristic during the tightening procedure as the holding element is provided with a stop edge which when fitted combines with the rear stop edge of the sealing element as will be explained in more detail later together with the explanation of the drawings and the fitting procedure.

In a further embodiment of the invention the holding element takes the form of a cutting ring with two cutting edges (progressive ring) whereby the advantages of the progressive ring combine to advantage with those of the sealing element.

In a further embodiment of the invention the holding element takes the form of a two-edge clamping ring.

In order to simplify handling the individual elements during fitting, it is of advantage to supply the sealing element and the holding element already joined together.

This reduces the number of single parts as compared to the two-part clamping device and eliminates the possibility of faulty fitting by the inadvertent use of incorrectly sized elements.

The two elements are joined to each other by push-fit or the use of adhesives whereby the adhesive contains a lubricant that is released during the fitting process. This ensures that the correct amount of lubricant is applied to the right location in the coupling device at the appropriate time.

The invention provides a further reduction in the number of components used during fitting in that a continuous or interrupted bead made of a vulcanized elastomer is provided on the outer diameter of the sealing element. This makes it possible to pre-assemble the two-part ring and its sealing ring with the coupling nut. This pre-assembly can be effected in the factory thus eliminating fitting faults by the inadvertent use of wrong components, and fitting times can be significantly shortened.

In a further embodiment of the invention, the connection between the two-part ring and the coupling nut can be effected by providing the holding element with an extension which proceeds through the base of the coupling nut and is gripped at its outer end by the coupling nut.

Further coupling facilities are provided in that the holding element adheres to the nut whereby the adhesive contains a lubricating agent which is released during the fitting.

DESCRIPTION OF THE DRAWINGS

FIG. 1 shows a cross-sectional and a side view of the coupling device when screwed together.

DESCRIPTION OF PREFERRED EMBODIMENTS

Figure 1:
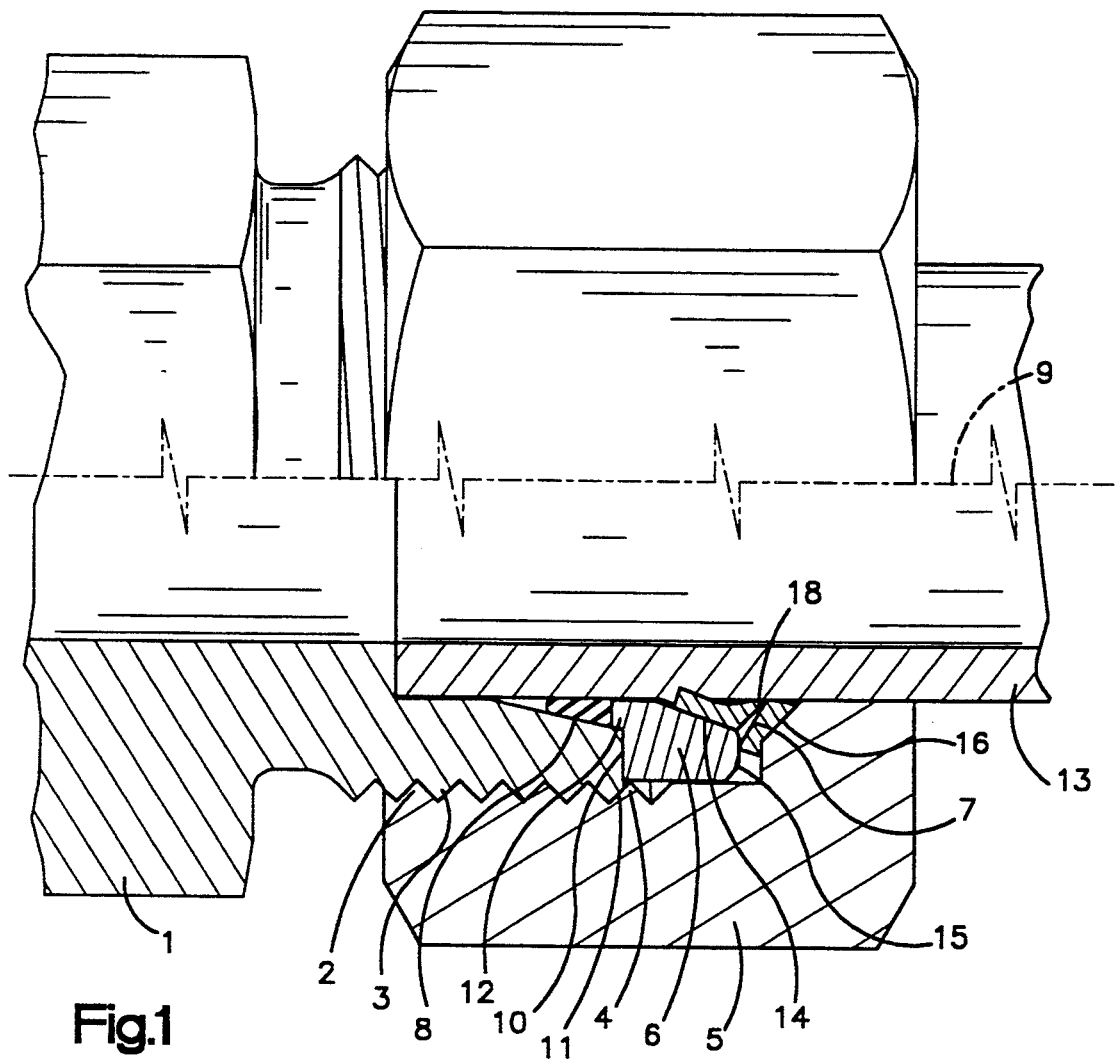
FIG. 1 is a fragmentary longitudinal section and a fragmentary view of the coupling device when fitted with an elastomer sealing element.

The coupling body or threaded stub 1 is provided with a 24 degree cone 2 as DIN 3861 or ISO 8434 and an outer helical thread 3 which engages the inner thread 4 of the coupling nut 5 when fitted. The coupling nut 5 is in this instance also standard to DIN 3870.

The two-part ring which when assembled is located between the coupling nut and threaded stub comprises a sealing element 6 and the holding element 7 whereby the sealing function and the holding function are separated. An elastomer seal 8 is secured by vulcanization in front of the sealing element 6.

It is also possible to insert a loose O-ring seal instead of the elastomer ring 8 to effect the seal in the 24 degree cone.

In the illustrated assembled device the stop face 10 of the sealing element 6 which progresses radially to its ring axis 9 abuts with the ring face 11 of the coupling body 1. A nose 12 extends across a part of the inner cone face (cone 2) of the coupling body 1. On the side facing the pipe wall 13, the sealing element 6 is provided with a conically progressing sliding surface 14 which proceeds to the stop face 15 progressing radially to the pipe axis 9.

The sliding face 14 is optimally designed as the sliding surface for the holding element 7 which slides along this surface during the fitting process. This can be achieved by a special polishing or hardening process or by a special coating. It is thus possible to reduce the friction and thereby the torque which has to be applied to the coupling nut during fitting process, very considerably.

With prior cutting ring screw couplings, the optimal design of the cone surface could only be achieved by treating the whole threaded stub or by a costly partial treatment process of the cones. In this version, the holding element 7 takes the form of a cutting ring with one cutting edge and carries out a secondary sealing function.

The holding element or cutting ring 7 is designed as a sprung element so that its rear section grips the pipe 13 and in this way exerts a dampening effect. By arranging the holding element 7 in the rear section, directed towards the inner contact face 16 of the coupling nut, a larger shearing volume when compared to prior cutting ring screw couplings is achieved before the pipe wall 13 is thus penetrated reducing the likelihood of the pipe being torn out.

FIG. 1 shows the coupling device in a completely assembled and fitted state. This is evidenced by the fact that the gap 20 between the stop face 18 of the holding element 7 and the radial stop face 15 of the sealing element 6 is completely closed when fitted.

By appropriate design of the axial stop faces 18 and 15, a sudden sharp increase in torque is experienced when the end of the correct fitting process is reached so that overtightening is effectively eliminated (stop fit).

Thus an optical fitting check is made possible without the need of any additional tools. If the gap 20 between the seal and the holding elements 6 and 7 is closed, the fitting process is complete and reliably functional and can be used for the most demanding of coupling applications. With this embodiment of the invention the holding element 7 takes the form of a cutting ring with one cutting edge.

The fitter is thus provided with a clear optical check of his fitting.

Figure 2:
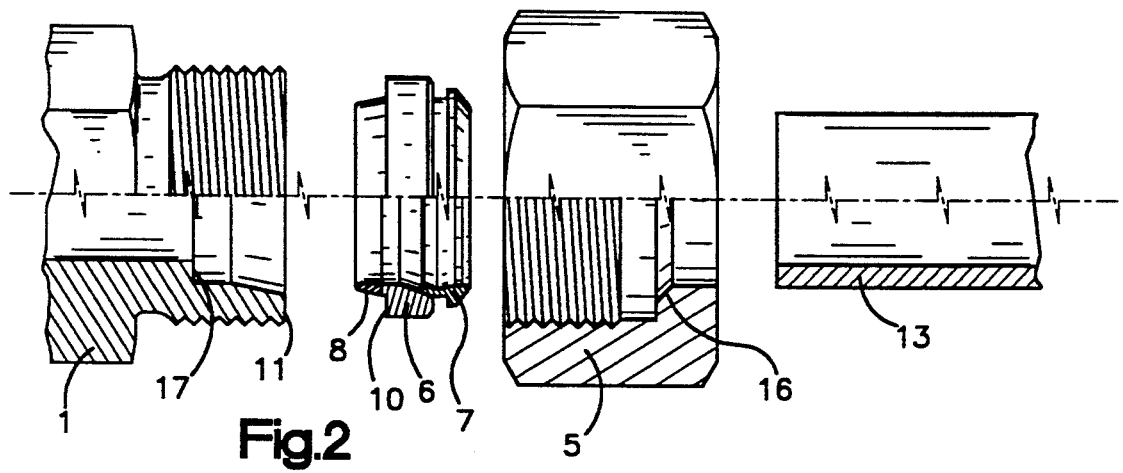
FIG. 2 is an exploded view of the individual coupling elements before fitting.

FIG. 2 shows the individual functional elements of the coupling before assembly, in an exploded view.

Here, the holding element 7 is already push-fitted to the sealing element 6 and the elastomer ring is secured by adhesive to the sealing element 6 or vulcanized to the sealing element. By this means, only one functional element has to be handled instead of three individual components. During fitting, the pipe 13 is introduced through the coupling nut 5, the holding element 7, the sealing element 6 and the elastomer ring 8 into the connection stub, up to its stop face 17.

If the coupling nut is tightened the contact face 6 abuts against the holding element 7 which forces the stop face 10 of the sealing element 6 against the inner ring face 11. The subsequent cutting process is described in more detail using FIG. 10 and the graphs 11 and 12.

Figure 3:
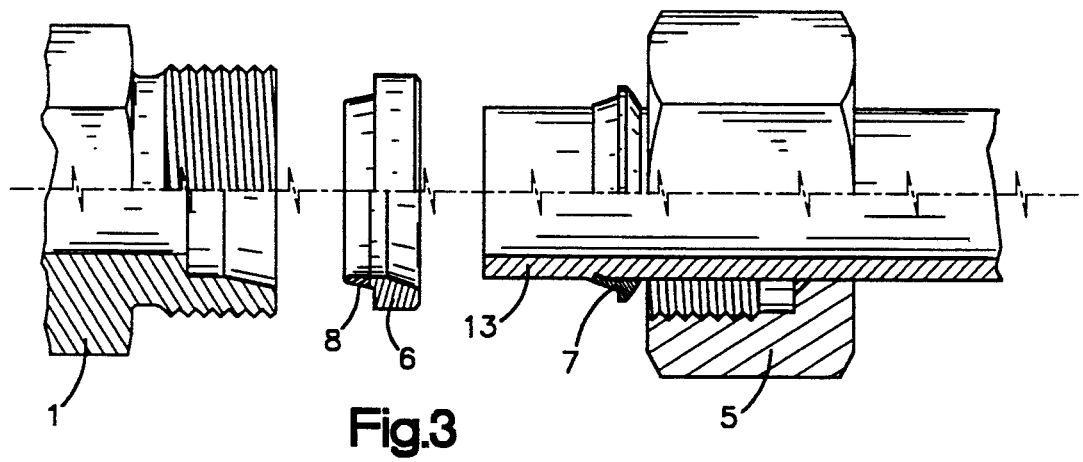
FIG. 3 is an exploded view of the individual coupling elements after fitting and subsequent dismantling.

If the coupling device is dismantled after having been completely fitted, the condition depicted in FIG. 3 will result.

After dismantling the fitting, the holding element 7 is inseparably connected to the pipe 13, whilst the sealing element 6 remains freely moveable and can thus be replaced.

Figure 4:
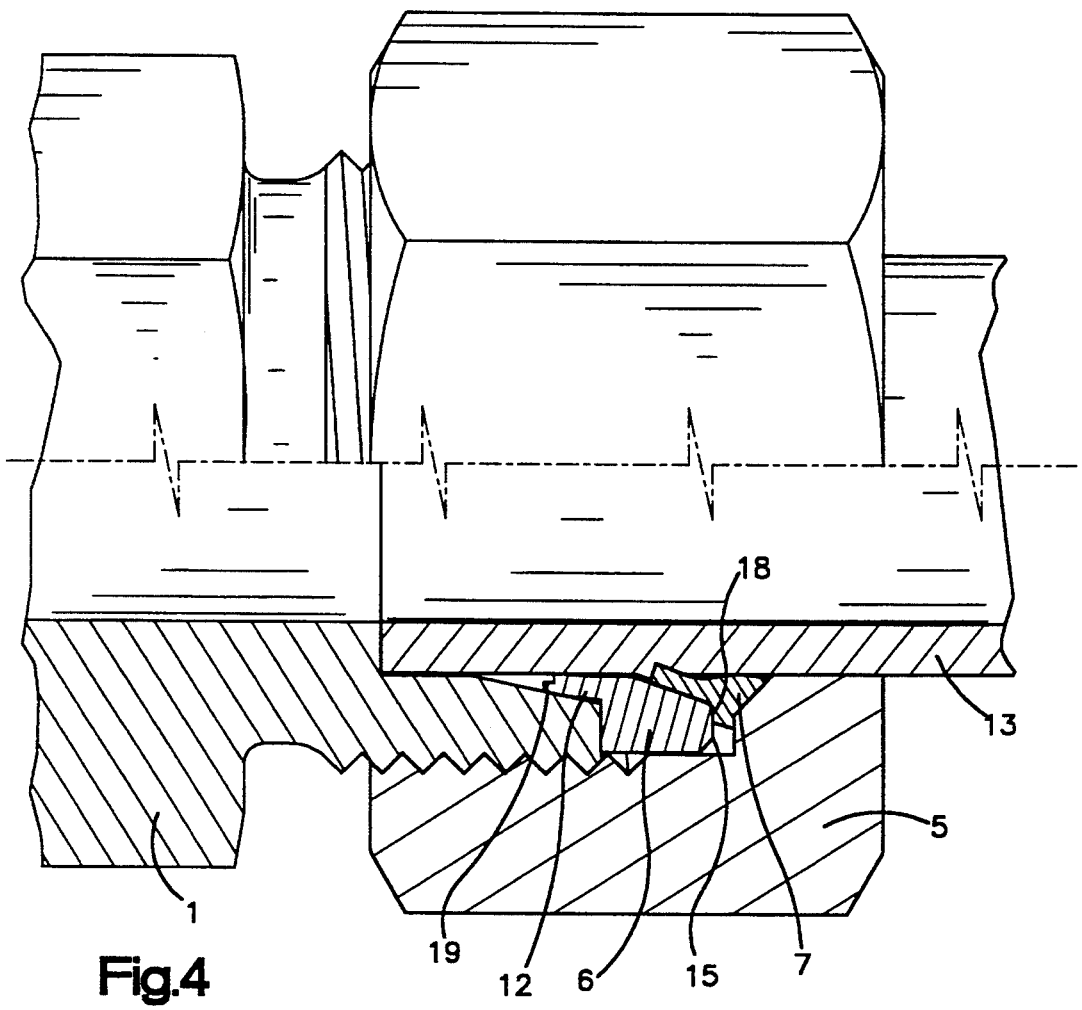
FIG. 4 is a fragmentary longitudinal section and a fragmentary view of the coupling device when fitted as in FIG. 1 but with the metallic version of the sealing element.

FIG. 4 depicts a further embodiment of the invention in a version similar to that illustrated in FIG. 1. The sealing element 6 is provided with a sealing lip 19 on its nose 12 which is pressed against the cone 2. This is made possible by the nose 12 being made slightly longer than that depicted in FIG. 1. This produces a gripping effect between the pipe 13 and the cone 2. The sealing element 6 is therefore not provided with an elastomer seal. The seal is thus a purely metallic device rendering it particularly suitable for high temperature and aggressive media applications where the use of elastomers is not possible.

Figure 5:
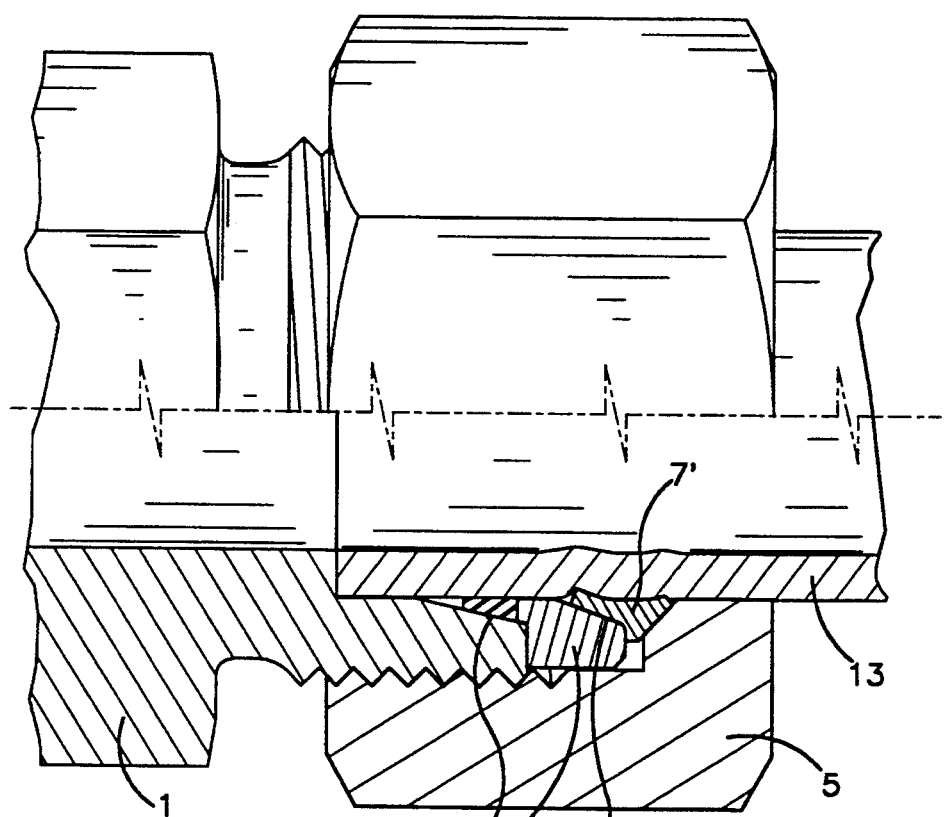
FIG. 5 is a fragmentary longitudinal section and a fragmentary view of the coupling device when fitted as in FIG. 1 but with the holding element in the form of a progressive ring.

In a further embodiment as depicted in FIG. 5, the holding element 7' takes the form of a cutting ring with two cutting edges (progressive ring) which has the advantage of gripping the pipe 13 along the whole length of the cone 14. The holding element 7' is deformed radially by the sliding face 14 which takes the form of a cone on the sealing element 6 and penetrates the pipe 13. By designing the cutting ring as a progressive ring—which is actually prior art—the retention force is considerably increased thus resulting in the coupling device being able to withstand even higher pressures.

Figure 6:
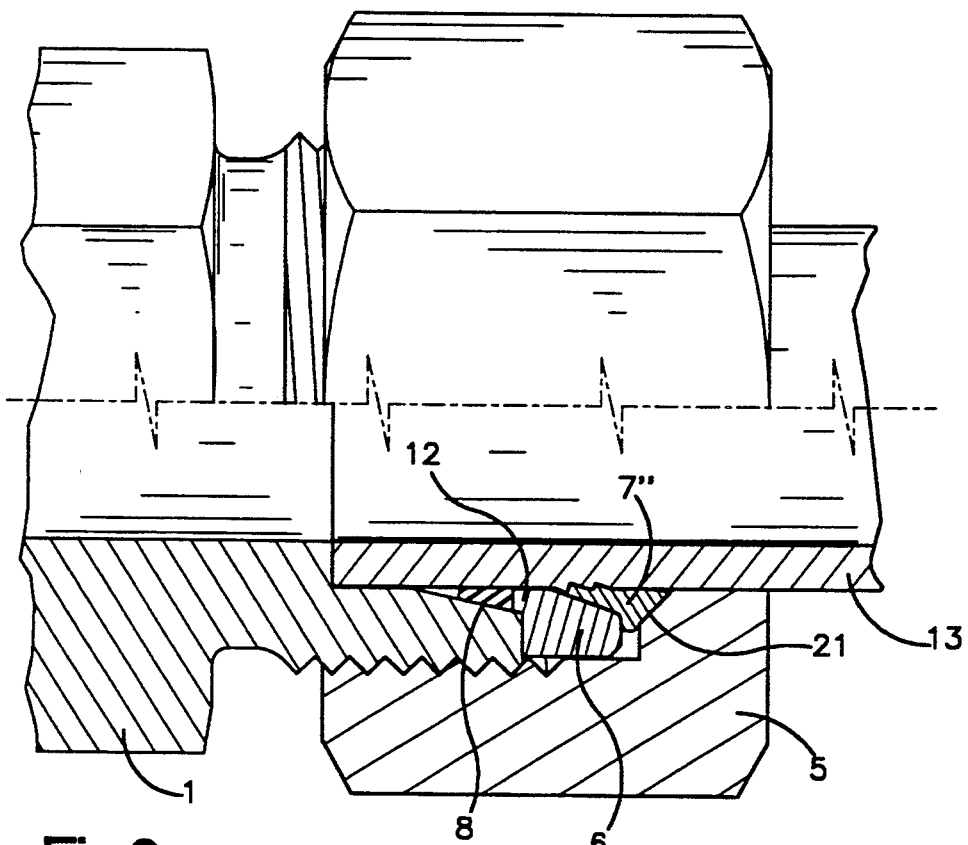
FIG. 6 is a fragmentary longitudinal section and a fragmentary view of the coupling device when fitted as in FIG. 1 but with the holding element in the form of a two-edged clamping ring.

FIG. 6 depicts a further embodiment of the invention in which in place of the cutting ring 7' a clamping ring 7" with two edges is employed. As this does not result in the pipe wall being penetrated, the pipe is also deformed radially. In the rear section, the holding element is gripped by the 45 degree angle 21 in the standard coupling nut 5. The considerable advantage of this geometrical construction of the holding element 7" is seen in the reduced tightening force required when compared to prior cutting ring elements.

Figure 10:
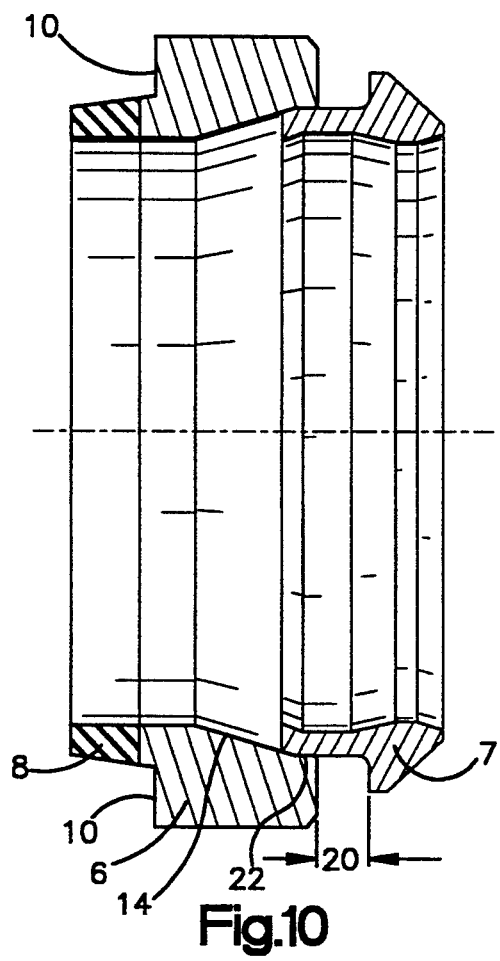
FIG. 10 is a longitudinal cross-section of a two-part ting, push-fit a vulcanized elastomer ring.

FIG. 10 depicts an enlarged view of the holding element 7 pressed together with the sealing element 6. The elastomer ting 8 is vulcanized to the sealing element.

The cone or the butting part of the sliding face of the sealing element 6 is provided with a cylindrical rim 22 which is smaller than the corresponding diameter of the holding element 7 thus permitting a push-fit.

Another possible variation is the retention of the holding element 7 in the cone 14 of the sealing element 6 with an adhesive. An adhesive has been selected which ruptures during fitting, releasing a lubricant which applies a film across the sliding face.

A further advantage of this pre-assembly of the individual elements is that the cutting edges of the holding element 7 are protected from external damage by being covered by the sealing element.

Figure 7:
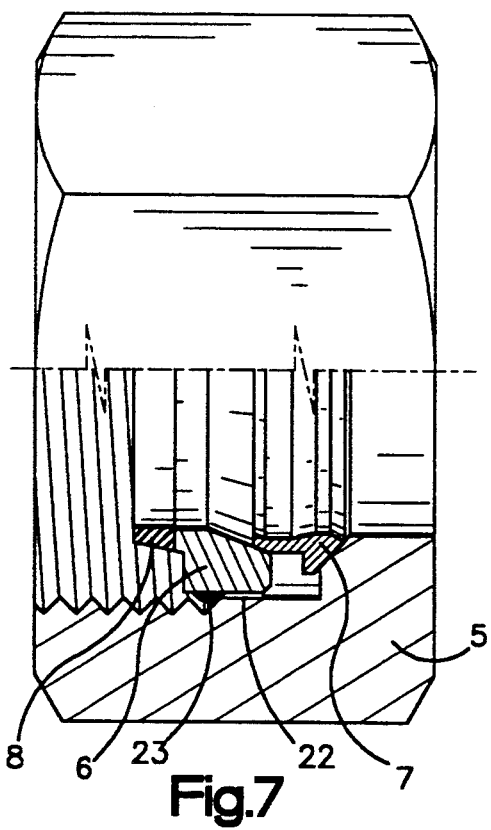
FIG. 7 is a fragmentary cross-section of a coupling nut with integrated two-part ring and a bead for centering and securing the element when supplied.
Figure 8:
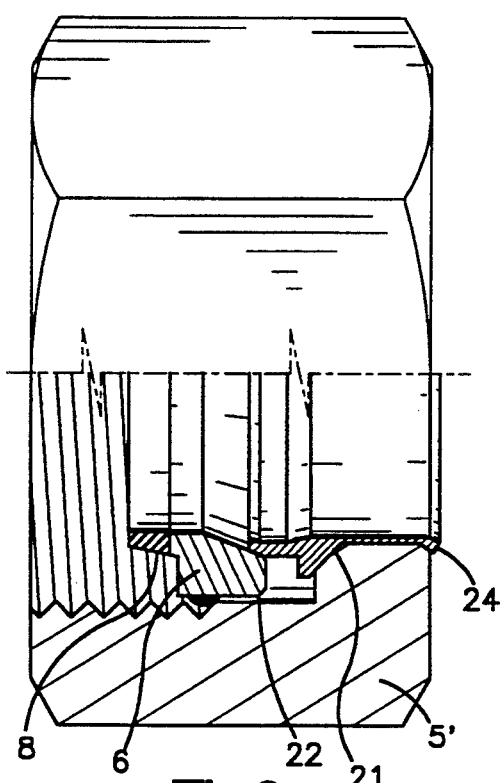
FIG. 8 is a fragmentary cross-section of a coupling nut with integrated two-part ring and an extended holding element for centering and securing the element when supplied.
Figure 9:
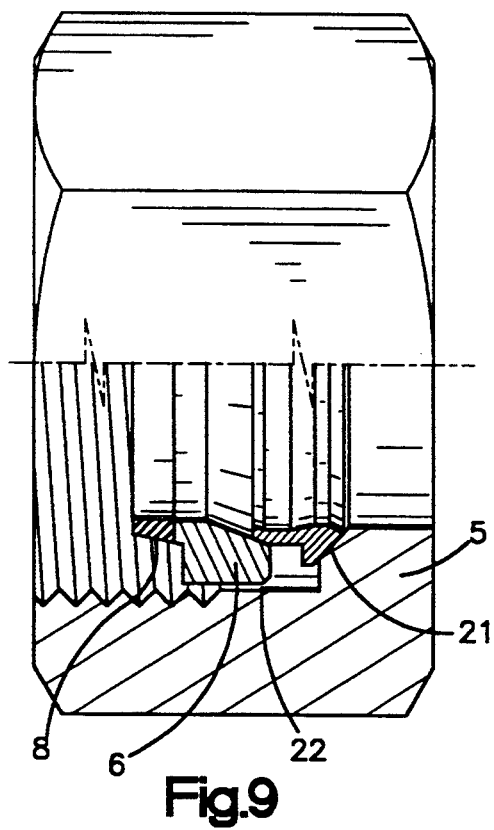
FIG. 9 is a fragmentary cross-section of a coupling nut with integrated two-part ring and a holding element secured with adhesive to the coupling nut for centering and securing the element when supplied.

FIGS. 7, 8 and 9 depict the so-called functional nuts 5' with integral sealing and holding elements 6 and 7 of the art described herein.

In all three cases, the sealing element 6 is a push-fit with the holding element 7 and suitably secured to it by the coupling nut 5 so that only one single element in the form of the coupling nut has to be handled, thus simplifying fitting and again reducing the likelihood of error.

One possible embodiment of the invention provides an elastomer bead 23 vulcanized to the outer diameter of the sealing element 6. The bead 23 wedges itself in the inner helical thread of the coupling nut 5, which however does not impair fitting.

A further possibility of attaching the holding element 7 and with it the sealing element 6 into the coupling nut 5 as depicted in FIG. 8 provides for the holding element 7 to be extended in such a manner that it can be passed through the base of the nut and turned (edge 24) and can thus be rotated whilst being held firmly by the nut. When dismantled, the turned edge is straightened thus ensuring that the coupling nut can be pushed back.

FIG. 9 depicts a further possibility of attaching the holding element 7 into the coupling nut 5. This provides for the holding element 7 to be secured to the nut 5 with an adhesive. An adhesive has been selected which ruptures during fitting, releasing a lubricant which applies a film across the sliding face.

In all cases, the considerable advantage of having to handle only one functional nut during fitting is achieved.

Figure 11:
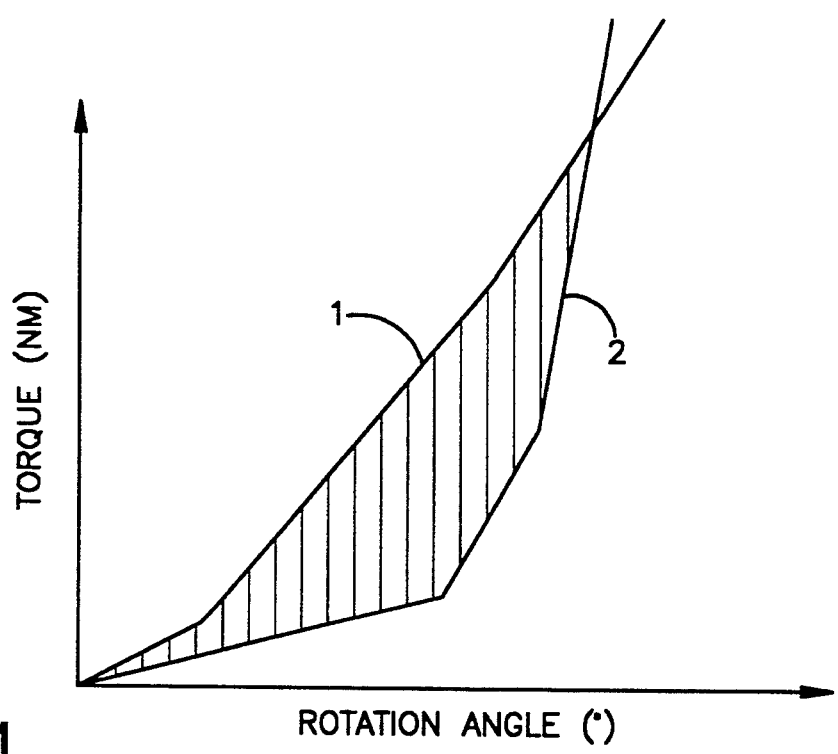
FIG. 11 is a graphical illustration of direct fitting.
Figure 12:
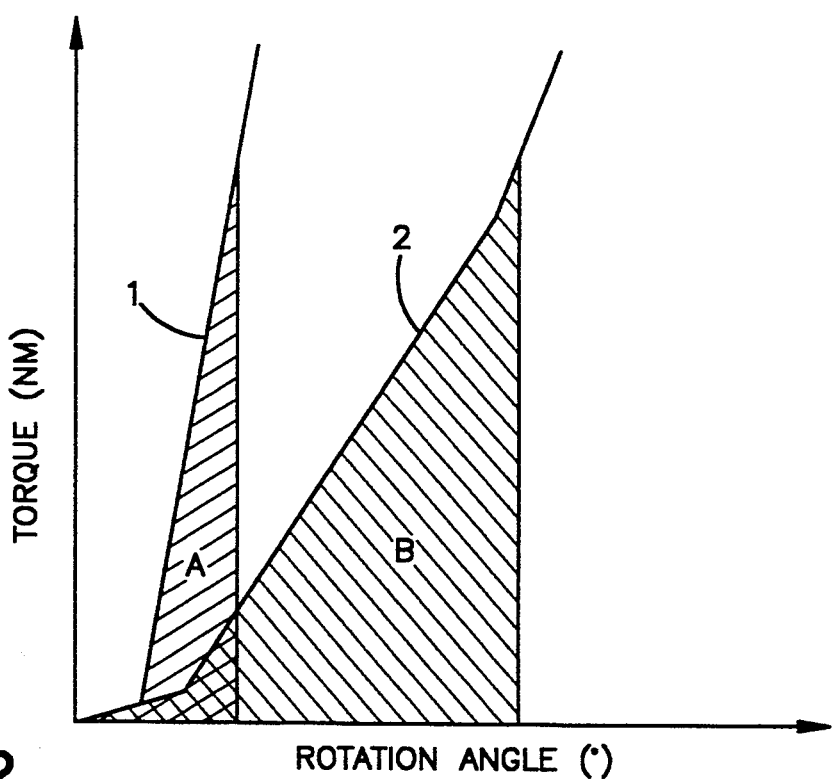
FIG. 12 is a graphical illustration of re-fitting.

FIGS. 11 and 12 give a graphical illustration of a direct fitting to a connection stub (FIG. 11) and the refitting of a pre-assembled device (FIG. 12).

The graphs depict the tightening of pipe connections whereby the torque is plotted against the torsional path. In FIG. 11 the fitting of two coupling devices are compared. Line 1 depicts the tightening of cutting ring coupling devices in general use. The torque increases uniformly from the start of the tightening and it is not possible for the fitter to register a positive end to the tightening process.

Line 2 depicts the tightening of the coupling device embodying the invention. At the beginning of the tightening process, the torque increases less than with state of the art devices. Towards the end, the torque increases very steeply as in this section the gap 20 between the axial stop faces 15 and 18 closes. This sudden increase of the torque is unmistakable and indicates to the fitter the completion of the tightening process, thus preventing overtightening. At the intersection of the two lines, the tightening process is completed in both cases. The area below the lines is a measure of the force expended. The graph clearly shows that the force required is significantly less with line 2. The shaded area is the difference between the areas of lines 1 and 2. It illustrates the saving in expended energy during the tightening process for the coupling device embodying the invention when compared to state of the an devices.

FIG. 12 depicts the tightening process of a pre-assembled coupling device embodying the invention which has been completely installed. {(Line 1 ) compared to prior art cutting ring couplings (Line 2)}. After a very short flat increase there is a sharp rise in the torque as the gap 20 between the axial stop faces 15 and 18 immediately closes when the device is re-fitted.

The great advantage of the coupling device embodying the invention over prior art cutting ring coupling devices is to be seen inter alia in the fact that, as a result of the separation of the sealing and holding functions, the device can be pre-assembled which corresponds to a cutting ring coupling final assembly. By this means, the use of the proposed coupling device embodying the invention leads to a considerable saving in labor and time when compared to prior art cutting ring coupling devices, particularly with regard to series production.

This point is illustrated by the area force required for the final fitting of the coupling device embodying the invention and force required for the final fitting of prior art cutting ring coupling devices.

What is claimed is:

1. An improved coupling device for pressure-tight pipe connection of the type having:
   a coupling body with an internal annular opening for receiving a pipe to be connected to the body, an annular conical face adjacent the annular opening, and a radially extending face adjacent the conical face;
   a pipe holding and sealing means; and a coupling nut which can receive the pipe to be connected to the body therethrough and which is threadably connectable to the body to make up and hold the pipe holding and sealing means with respect to the body and nut, the improvement comprising:

said pipe holding and sealing means comprising:
a holding ring having a cutting tooth portion for cutting into and holding a pipe received therethrough, a nut engaging face for engaging the nut, and a holding ring stop face which extends radially; and
a sealing ring having:
a metal sealing ring body;
a first radially extending stop face on said sealing ring body which, when the coupling is assembled and properly tightened to a pipe, abuts the radially extending face of the coupling body and stops the sealing ring with respect thereto;
an elastomer sealing means attached to the sealing ring body and extending adjacent the first radially extending stop face and which, when the coupling is assembled and properly tightened to a pipe is pressed between the annular conical face of the coupling body and pipe without cutting into the pipe so as to form a compression type seal therebetween;
a conically progressing sliding face on said sealing ring body for slidingly receiving the cutting tooth portion of the holding ring so that as the nut is tightened on the body the cutting tooth portion of the holding ring slides along the sliding face of the sealing ring and cuts into the pipe; and
a second radially extending stop face on said sealing ring body which, when the coupling is assembled and properly tightened to a pipe, abuts the radially extending holding ring stop face of the holding ring and stops the sealing ring with respect thereto.

2. The coupling device of claim 1 wherein the sealing ring body is connected to the sealing means by vulcanization.

3. The coupling device of claim 1 wherein the sealing ring body is connected to the sealing means by an adhesive.

4. The coupling device of claim 1 wherein the sealing ring and the holding ring, prior to assembly and tightening in a made up coupling, are connected so as to form a single piece for use during assembly.

5. The coupling device of claim 4 wherein the sealing ring and the holding ring are connected by means of a press fit.

6. The coupling device of claim 4 wherein the sealing ring and holding ring are connected by means of adhesive.

7. The coupling device of claim 6 wherein the sealing ring and holding ring are connected by an adhesive which contains a lubricating agent which is released during tightening and make up of the coupling to a pipe.

8. The coupling device of claim 4 wherein the sealing ring and holding ring, prior to assembly and tightening in a made up coupling, are connected to the nut so as to form a single piece for use during assembly.

9. The coupling device of claim 8 wherein the sealing ring is connected to the nut by an adhesive.

10. The coupling device of claim 9 wherein the sealing ring is connected to the nut by an adhesive which contains a lubricating agent which is released during tightening and make up of the coupling to a pipe.

11. The coupling device of claim 8 wherein the sealing ring has an outer diameter face and wherein a connecting bead of elastomer is disposed on the outer diameter face to allow the sealing ring to be resiliently connected to the nut thereby.

12. The coupling device of claim 8 wherein the nut has an annular opening through which the pipe can extend and wherein the holding ring has an extension which extends through the annular opening to hold the holding ring to the nut.

* * * * *